Patented Sept. 7, 1937

2,092,005

UNITED STATES PATENT OFFICE 2,092,005

MANUFACTURE OF ARTIFICIAL MATERIALS

Robert Wighton Moncrieff and Frank Brentnall Hill, Spondon, near Derby, England, assignors to Celanese Corporation of America, a corporation of Delaware No Drawing. Application November 28, 1934, Serial No. 755,232. In Great Britain December 1, 1933

4 Claims. (Cl. 8—20)

This invention relates to the manufacture of filaments, threads, yarns and like materials made of or containing cellulose acetate or other organic esters of cellulose.

We have found that artificial materials of particularly valuable properties may be obtained by stretching in the presence of softening agents filaments, threads, yarns and like materials comprising organic esters of cellulose which have undergone a partial but relatively deep-seated saponification, that is to say a saponification which is not confined to the surface or even particularly intense on the surface, but which extends considerably below the surface. The ideal type of saponification for the process of the invention is uniform throughout the entire section of the material, but this cannot always be realized in practice. We have found that for the purpose of the invention saponification effected by means of aqueous mono-methylamine is particularly suitable and that other organic bases, particularly lower aliphatic amines such, for example, as ethylene diamine, may also be employed with advantage as the saponifying agents.

The process of the invention is particularly applicable to the treatment of materials comprising cellulose acetate and will be described with particular reference to the manufacture of such materials. The materials treated may be made by wet or dry spinning methods from esters of high, low or medium viscosity. In the case of cellulose acetate, for example, the viscosity may be of the order of 30 up to 100, 200 or even higher, these figures being obtained by comparison of a 6% solution of the acetate in acetone at 25° C. with glycerine at the same temperature taken as 100. On the other hand, the viscosity of the cellulose acetate may be of the order of 10–20 or even lower, or between 20 and 30, measured on the same scale.

As indicated above, the saponification effected should penetrate to a considerable extent below the surface of the materials or even throughout their section, and certain special methods of saponification have been found particularly suitable. The advantage of employing mono-methyl-amine as the saponifying agent has been referred to. Among other strong aliphatic bases which may be employed, mention may be made of ethyl-amine, propylamine, amylamine and triethyl-amine. Somewhat weaker bases of the same series, for example trimethylamine and allylamine, may also be used, but with somewhat less advantage than the stronger bases referred to above. Again, considerably stronger bases may be employed, even very strong bases such as tetramethyl ammonium hydroxide, provided care be taken to avoid damaging the materials. Ethylene diamine has already been referred to. Other amines containing more than one amino group, and particularly aliphatic diamines of relatively low molecular weight, for example symmetrical dimethyl ethylene diamine, mono-methyl ethylene diamine and propylene diamine, may be used. Preferably at least one of the amino groups of such amines should be unsubstituted or mono-substituted. Amines containing more than two amino groups may also be employed, for example 1:2:3-triamino propane. The effect of one or more hydroxy groups in the amine appears to be to favour the penetration of the materials by the saponifying agent. Thus, for example, substances of the type of $\alpha\gamma$-diamino-$\beta$-hydroxy propane may be employed with this object in view. Generally speaking, aqueous concentrations of the amine of 10–30% and particularly 15–25% are preferable, and the temperatures may range from below atmospheric temperature to the neighbourhood of the boiling point of the solution, although it is most convenient to work at temperatures between 15 or 20° C. and 25–35° C. The concentrations and temperatures employed in particular cases will naturally depend upon the properties of the particular base employed. In general, the conditions may be chosen so that the desired degree of saponification may be effected by means of a treatment lasting from 1 minute or less up to 2 or 3 minutes.

Saponification may also be effected by means of caustic soda or other strong alkali in the presence of swelling agents, for example acetone, dimethyl ether of ethylene glycol, dioxane, methylene ethylene ether and similar cyclic ethers, alcohols, for instance diacetone alcohol, cyclohexanol and benzyl alcohol, or aromatic hydroxy compounds such as phenol.

Saponification may also be effected by means of a solution of caustic soda or other strong mineral alkali in the presence of gelatine or like colloidal substances, or water-soluble substances of high molecular weight, for example egg-albumen, casein or other albuminous substances, or substances comprising amino acids or anhydroamino acids, for example leucine, aspartic acid, glutamic acid, proline, lysine, histidine or tyrosine; or potato starch, dextrin, $\gamma$-cellulose, cellobiose, sucrose, glucose and other water-soluble carbohydrates of high molecular weight; or by means of a colloidal substance of relatively strongly alkaline reaction such as sodium silicate.

The saponifying agents may be applied to the materials in any suitable manner. Preferably they are applied in the form of an aqueous bath. A convenient method, especially when conditions are such that saponification is relatively slow, is to suspend the material in hank form from rods which are caused to travel from one end of the bath to the other and at the same time to revolve so as to immerse each portion of the hank in turn to the same depth. A method which is to be preferred when saponification is relatively rapid is to pass the materials continuously through the bath. When the materials are in thread or like form they are preferably treated in "warp formation", i. e. a large number of ends are drawn through the bath in substantially parallel relationship one to another in the same plane. Thus, yarn may be drawn from a creel by means of suitable godets, rolls or like members partially or completely immersed in the bath and extending across the whole assembly of ends or so-called "warp", through a reed into and through the bath and through a further reed or reeds to suitable collecting means situated outside the bath. Again, the materials may, for example in the form of hanks or other suitable packages, be introduced into a bath containing the saponifying agent and allowed to remain in contact therewith until the desired degree of saponification is effected.

During the application of the saponifying agent and/or during saponification itself or after treatment up to the stretching stage, the materials may be under considerable tension, or may be under substantially no applied tension, so as to facilitate contraction of the materials as a result of saponification.

The degree of saponification may be sufficient to remove 8–10% of the acidyl content of the ester, but is preferably somewhat greater, for example sufficient to remove 15–20% of the acidyl content. The degree of saponification may even be still higher, for instance sufficient to remove 25% of the acidyl content.

The partially saponified materials may be softened and stretched by any suitable method. In general, it is preferred to draw the materials through a bath containing the softening agent by means of one or a series of rollers or like devices travelling at peripheral speeds in excess of the speed at which the materials are fed to the apparatus. Where a series of such rollers is employed, the various members may have substantially the same peripheral speed or peripheral speeds increasing along the path of the materials. On the other hand, stretching may be effected in stages with a rest interval between stages, during which the tension on the materials is decreased or removed so as to facilitate contraction under the influence of the swelling agent. The materials are preferably stretched in warp formation, and the rollers or like members employed in stretching and in forwarding the materials to the stretching apparatus should preferably extend across the whole warp.

As examples of suitable softening agents for use in connection with cellulose acetate materials, mention may be made of acetone, the mono- and di-methyl ethers of ethylene glycol, dioxane and methylene ethylene ether. These are, however, only a few typical examples of suitable agents, and a number of other suitable softening agents are available among solvents and swelling agents for organic esters of cellulose. For materials comprising cellulose acetate 35–40% aqueous dioxane has been found particularly suitable. The concentration of the softening agent may be somewhat critical since partial deep-seated saponification such as is contemplated in the process of the invention may render the materials particularly liable to damage if the concentration of the softening agent is too high.

The stretching process is preferably carried out so as to effect a relatively high degree of stretch, for example so as to stretch the materials to 150 or 200% or more of their original length. On the other hand, the tenacity of the materials may in many cases be materially increased by stretching them to less than 150%, e. g. 125% of their original length.

The following examples are given in order to illustrate the invention, but it is to be understood that they do not limit it in any way:—

*Example 1*

Cellulose acetate yarn is led continuously in warp formation from a creel through a saponifying bath containing a 15–20% aqueous solution of mono-methylamine at a temperature of 25–30° C. The rate of travel through the bath is adjusted so that 8 to 10, 15 or 20% of the acetyl content, calculated as fatty acid, is removed.

The yarn leaving the bath is passed through a washing bath to remove methylamine, then over heated rollers to dry the yarn, and then through a further bath containing a 25 or 30 to 40 or 45% aqueous solution of dioxane. The yarn is carried through this bath by a series of rollers rotating at progressively increasing speeds along the path of the yarn. After leaving the stretching bath, the yarn is again washed and dried and is then collected by suitable means.

*Example 2*

The process is carried out as described in Example 1 except that in the saponifying bath mono-methylamine is replaced by ethylene diamine and the saponifying bath is maintained at 70–90° C.

*Example 3*

Cellulose acetate yarn which has been saponified by treatment with an aqueous bath containing mono-methylamine so as to effect a loss in weight of 5–8% is passed continuously in warp formation through an aqueous bath containing 35–40% of dioxane. During the passage of the material through the bath it is stretched to between 150 and 300% of its original length according to the tenacity and extensibility desired in the final product. On leaving the bath the material is washed, dried and collected by suitable means.

The process of the invention is capable of producing materials of greatly improved properties in many respects over ordinary cellulose ester materials. Thus, the products of the invention may have a high affinity for cotton dyes while retaining their affinity for cellulose ester dyes, for example the so-called S. R. A. dyes. The process enables materials of high tensile strength and of good extensibility to be produced. The products will in general have a considerably higher safe ironing point than ordinary cellulose acetate materials.

Although the invention has been described with particular reference to the treatment of materials having a basis of cellulose acetate, it is also applicable to the treatment of other materials containing saponifiable esters of cellulose, for example cellulose formate, propionate, butyrate, ethyl cellulose acetate, oxyethyl cellulose acetate and nitrocellulose acetate.

What we claim and desire to secure by Letters Patent is:—

1. Process for the treatment of filaments, threads, ribbons and the like having a basis of organic esters of cellulose which have been subjected to partial, deep-seated saponification resulting in a loss of 15–25% of the acidyl content, which comprises softening the materials with an agent capable of softening the initial unsaponified materials, and stretching the softened materials.

2. Process for the treatment of filaments, threads, ribbons and the like having a basis of cellulose acetate which have been subjected to partial, deep-seated saponification resulting in a loss of 15–25% of the acetyl content, which comprises softening the materials by treatment with an aqueous bath containing 35–40% of dioxane, and stretching the softened materials.

3. Process for the manufacture of improved artificial materials, comprising treating filaments, threads, yarns and like materials having a basis of cellulose acetate with an organic base in the liquid phase so as to effect a relatively deep-seated saponification resulting in a loss of 15–25% of the acetyl content, thereafter softening the saponified materials by drawing them through an aqueous bath containing 35–40% dioxane, and stretching them to at least 150% of their original length during their passage through said bath.

4. Process for the manufacture of improved artificial materials, comprising treating filaments, threads, yarns and like materials having a basis of cellulose acetate with an organic base in the liquid phase so as to effect a relatively deep-seated saponification resulting in a loss of 15–25% of the acetyl content, thereafter softening the saponified materials by drawing them through an aqueous bath containing 40–50% acetone, and stretching them to at least 150% of their original length during their passage through said bath.

ROBERT WIGHTON MONCRIEFF.
FRANK BRENTNALL HILL.